United States Patent
Brown et al.

(10) Patent No.: US 6,665,666 B1
(45) Date of Patent: Dec. 16, 2003

(54) SYSTEM, METHOD AND PROGRAM PRODUCT FOR ANSWERING QUESTIONS USING A SEARCH ENGINE

(75) Inventors: Eric William Brown, New Fairfield, CT (US); Anni R. Coden, Bronx, NY (US); John Martin Prager, Pomona, NY (US); Dragomir Radkov Radev, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/495,645

(22) Filed: Feb. 1, 2000

Related U.S. Application Data

(60) Provisional application No. 60/161,427, filed on Oct. 26, 1999.

(51) Int. Cl.⁷ ............................ G06F 17/30; G06F 7/00
(52) U.S. Cl. ...................................................... 707/5
(58) Field of Search ............................ 704/9; 707/3–6, 707/100, 102

(56) References Cited

U.S. PATENT DOCUMENTS

| | | | | |
|---|---|---|---|---|
| 5,297,039 A | * | 3/1994 | Kanaegami et al. | 707/5 |
| 5,309,359 A | | 5/1994 | Katz et al. | 707/102 |
| 5,321,608 A | * | 6/1994 | Namba et al. | 704/9 |
| 5,369,575 A | * | 11/1994 | Lamberti et al. | 704/9 |
| 5,384,894 A | * | 1/1995 | Vassiliadis et al. | 706/52 |
| 5,404,295 A | | 4/1995 | Katz et al. | 707/2 |
| 5,418,948 A | * | 5/1995 | Turtle | 707/4 |
| 5,442,780 A | * | 8/1995 | Takanashi et al. | 707/1 |
| 5,819,265 A | | 10/1998 | Ravin et al. | 707/5 |
| 5,832,480 A | | 11/1998 | Byrd, Jr. et al. | 707/5 |
| 5,884,302 A | * | 3/1999 | Ho | 707/3 |
| 6,076,088 A | * | 6/2000 | Paik et al. | 707/5 |
| 6,081,774 A | * | 6/2000 | de Hita et al. | 704/9 |
| 6,094,649 A | * | 7/2000 | Bowen et al. | 707/3 |
| 6,173,279 B1 | * | 1/2001 | Levin et al. | 707/5 |
| 6,233,547 B1 | * | 5/2001 | Denber | 704/9 |
| 6,295,529 B1 | * | 9/2001 | Corston-Oliver et al. | 707/3 |
| 6,487,545 B1 | * | 11/2002 | Wical | 706/45 |
| 6,584,464 B1 | * | 6/2003 | Warthen | 707/4 |

OTHER PUBLICATIONS

Ravin, Y. et al., "Extracting Names from Natural–Language Text," IBM Research eport 20338, 1996, 1–30.

Byrd, R. J. et al., "Identifying and Extracting Relations in Text," *Proceedings of NLDB 99*, Klagenfurt, Austria, 5 pages.

Kupiec, J., "MURAX: A Robust Linguistic Approach For Question Answering Using An On–Line Encyclopedia," ACM–SIGIR '93—Pittsburgh, PA USA, pp. 181–190.

* cited by examiner

*Primary Examiner*—Greta Robinson
*Assistant Examiner*—Susan Rayyan
(74) *Attorney, Agent, or Firm*—Louis J Percello

(57) ABSTRACT

The present invention is a system, method, and program product that comprises a computer with a collection of documents to be searched. The documents contain free form (natural language) text. We define a set of labels called QA-Tokens, which function as abstractions of phrases or question-types. We define a pattern file, which consists of a number of pattern records, each of which has a question template, an associated question word pattern, and an associated set of QA-Tokens. We describe a query-analysis process which receives a query as input and matches it to one or more of the question templates, where a priority algorithm determines which match is used if there is more than one. The query-analysis process then replaces the associated question word pattern in the matching query with the associated set of QA-Tokens, and possibly some other words. This results in a processed query having some combination of original query tokens, new tokens from the pattern file, and QA-Tokens, possibly with weights. We describe a pattern-matching process that identifies patterns of text in the document collection and augments the location with corresponding QA-Tokens. We define a text index data structure which is an inverted list of the locations of all of the words in the document collection, together with the locations of all of the augmented QA-Tokens. A search process then matches the processed query against a window of a user-selected number of sentences that is slid across the document texts. A hit-list of top-scoring windows is returned to the user.

13 Claims, 12 Drawing Sheets

FIG.3

310, PATTERNS-FILE

| QA-TOKEN | WEIGHT | CHARACTER | DETAIL | REMOVE | ADD |
|---|---|---|---|---|---|
| PERSON$ | 1 | WHO | | | |
| RATE$ | 1 | WHAT | .RATE | | |
| WEIGHT$ | 1 | HOW MANY | _WEIGHT | | |
| COUNTRY$ | 1 | WHICH | COUNTRY | COUNTRY | |
| NAME$ | 1 | WHAT_AUX | STAND FOR | STAND FOR | MEAN |
| @SYN(ORG$, PERSON$, NAME$) | @SYN (1,2,3) | NAME | | | |

330 — 331 — 332 — 334 — 336 — 338

320

SYSTEM, METHOD AND PROGRAM PRODUCT FOR ANSWERING QUESTIONS USING A SEARCH ENGINE

This application claims the benefit of provisional application 60/161,427 filed Oct. 26, 1999.

FIELD OF THE INVENTION

This invention relates to the field of querying and searching collections of text. More specifically, the invention relates to querying and searching collections of text in a networking environment.

BACKGROUND OF THE INVENTION

Text documents contain a great deal of factual information. For example, an encyclopedia contains many text articles consisting almost entirely of factual information. Newspaper articles contain many facts along with descriptions of newsworthy events. The World Wide Web contains millions of text documents, which in turn contain at least a small amount of factual information.

Given this collection of factual information, we naturally desire the ability to answer questions based on this information using automatic computer programs. Previously two kinds of computer programs have been created to search factual information: database management systems and information retrieval systems. A database management system (DBMS) assumes that information is stored in a structured fashion, such that each data element has a known data type and a set of legal operations. For example, the relational database management system (RDBMS) provides the Structured Query Language, or SQL, which specifies a syntax and grammar for the formulation of queries against the database. SQL is based on a relational calculus that restricts queries to include only certain operations on certain data types, and certain combinations of those operations.

A relational database is tailored to applications where the factual information is available in a structured form. To address the factual information contained in free text documents, information retrieval (IR) systems were created. An information retrieval system indexes a collection of documents using textual features (e.g., words, noun phrases, named entities, etc.). The document collection can then be searched using either Boolean queries or natural language queries. A Boolean query consists of textual features and Boolean operators (e.g., and, or, not). To evaluate a Boolean query, an IR system returns the set of documents that satisfies the Boolean expression. A natural language query is a free form text query that describes the user's information need. Documents likely to satisfy this information need are then found using a retrieval model that matches the query with documents in the collection. Popular models include the probabilistic and vector space models, both of which use text feature occurrence statistics to match queries with documents. In all cases, an IR system only identifies entire documents that are likely to satisfy a user's information need.

Ideally, the user would be able to phrase a specific question, e.g., "What is the population of the world?", and the computer program would respond with a specific answer, e.g., "6 billion". Moreover, the computer program will produce these answers by analyzing the factual information available in the vast supply of text documents, examples of which were given previously. Thus, the problem at hand is how to automatically process free text documents and provide specific answers to questions based on the factual information contained in the analyzed documents.

STATEMENT OF PROBLEMS WITH THE PRIOR ART

When users have an information need, search engines are typically used to find the desired information in a large collection of documents. The user's query is treated as a bag of words, and these are matched against the contents of the documents in the collection; the documents with the best matches, according to some scoring function, are returned at the top of a hit-list. Such an approach can be quite effective in the case one is looking for information about some topic. However, if one desires an answer to a question, a different approach has to be attempted for the following reasons: (1) Using a standard search engine approach, the user gets back documents, rather than answers to a question. This then requires browsing the documents to see if they do indeed contain the desired answers (which they may not) which can be a time consuming process. (2) No attempt is made to even partially understand the question, and make appropriate modifications to the processing. So, for example, if the question is "Where is XXX", the word "where" will either be left intact and submitted to the search engine, which is a problem since any text giving the location of XXX is very unlikely to include the word "where", or the word will be considered a stop-word and stripped out, leaving the search engine with no clue that a location is sought.

The above discussion describes the most commonly found situation. There are two approaches that have been used in an attempt to provide better service for the end-user.

The first of these does not directly use search engines at all, and is currently in use by AskJeeves (www.askjeeves.com). This approach uses a combination of databases of facts, semantic networks, ontologies of terms and a way to match user's questions to this data to convert the user's question to one or more standard questions. Thus the user will ask a question, and the system will respond with a list of questions that the system can answer. These latter questions match the user's question in the sense that they share some keywords in common. A mapping exists between these standard questions and reference material, which is usually in the form of topical Web pages. This is done by generating for these pages one or more templates or annotations, which are matched against the user's questions. These templates may be either in natural-language or structured form. The four major problems with this approach are:

(1) Building and maintaining this structure is extremely labor-intensive and potentially error-prone, and is certainly subjective.

(2) When new textual material (such as news articles) comes into existence, it cannot automatically be incorporated in the "knowledge-base" of the system, but must wait until a human makes the appropriate links, if at all. This deficiency creates a time-lag at best and a permanent hole in the system's capability at worst. Furthermore, using this approach, only a pointer to some text where the answer may be found is given instead of the answer itself. For instance, asking: How old is President Clinton? returns a set of links to documents containing information about President Clinton, however, there is no guarantee that any of these documents will contain the age of the President. Generating these templates automatically cannot be done accurately with the current state of the art in automatic text understanding.

(3) It can easily happen that there is no match between the question and pre-stored templates; in such cases these prior art systems default to standard (non-Question-Answering) methods of searching.

(4) There is no clear way to compute the degree of relevance between the question and the text that is returned, so it is not straightforward to determine how to rank-order these texts.

The second approach uses traditional search-engines with post-processing by linguistic algorithms, and is the default mechanism suggested and supported by the TREC-8 Question-Answering track. In this approach, a question is submitted to a traditional search engine and documents are returned in the standard manner. It is expected that many of these documents will be false hits, for reasons outlined earlier. Linguistic processing is then applied to these documents to detect one (or more) instances of text fragments that correspond to an answer to the question in hand. The thinking here is that it is too computationally expensive to apply sophisticated linguistic processing to a corpus that might be several gigabytes in size, but it is reasonable to apply such processing to a few dozen or even a few hundred documents that come back at the top of the hit list. The problem with this approach, though, is that, again for reasons given earlier, even the top documents in the hit-list so generated might not contain the sought-after answers. In fact, there may well be documents that do answer the questions in the corpus, but score so poorly using traditional ranking algorithms that they fail to appear in the top section of the hit-list that is subject to the linguistic processing.

The prior art can answer questions that are structured (SQL) posed against structured data but can't deal with unstructured questions/data. EasyAsk (Tm) (www.EasyAsk.com) is a system which (after some training on the underlying database) takes question posed in plain English and translates them into an SQL query which then retrieves the data. The answers of the questions are constrained to some value as stored in the database.

OBJECTS OF THE INVENTION

An object of this invention is an improved system and method for determining specific answers from queries of text.

An object of this invention is an improved system and method for determining answers from queries against free form text.

An object of this invention is an improved system and method for determining answers using free form queries.

SUMMARY OF THE INVENTION

The present invention is a system, method, and program product that comprises a computer with a collection of documents to be searched. The documents contain free form (natural language) text. We define a set of labels called QA-Tokens, which function as abstractions of phrases or question-types. We define a pattern file, which consists of a number of pattern records, each of which has a question template, an associated question word pattern, and an associated set of QA-Tokens. We describe a query-analysis process which receives a query as input and matches it to one or more of the question templates, where a priority algorithm determines which match is used if there is more than one. The query-analysis process then replaces the associated question word pattern in the matching query with the associated set of QA-Tokens, and possibly some other words. The tokens in the processed query (the words and QA-Tokens) are optionally converted to lemma form, stop-words are optionally removed and tokens are optionally assigned weights. This results in a processed query having some combination of original query tokens, new tokens from the pattern file, and QA-Tokens, possibly with weights. We describe a pattern-matching process that identifies patterns of text in the document collection and augments the location with corresponding QA-Tokens. We define a text index data structure which is an inverted list of the locations of all of the words in the document collection, together with the locations of all of the augmented QA-Tokens. A search process then matches the processed query against a window of a user-selected number of sentences that is slid across the document texts. The windows are assigned a score from the number of matches of words in the window with words in the processed query, weighting if desired. A hit-list of top-scoring windows is returned to the user.

BRIEF DESCRIPTION OF THE DRAWINGS

The foregoing and other objects, aspects and advantages will be better understood from the following detailed description of preferred embodiments of the invention with reference to the drawings that are include the following:

FIG. 3 is a block diagram of a Pattern-file.

DETAILED DESCRIPTION OF THE INVENTION

Figure 1:
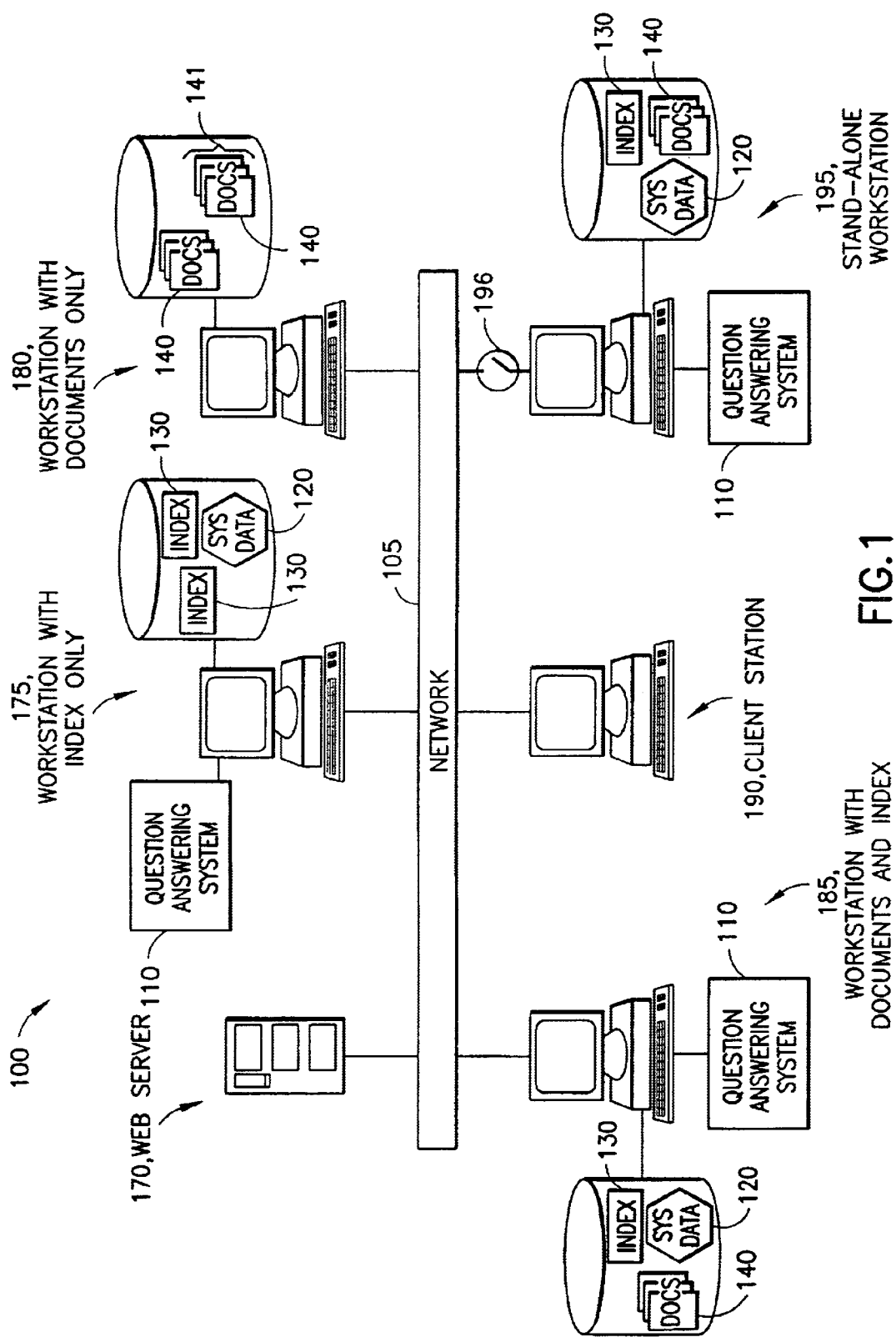
FIG. 1 is a block diagram of the computing environment in which the present invention is used in a non-limiting preferred embodiment.

In general, the invention first analyzes the query by a pattern-matching program, which when the invention recognizes certain patterns of words in a query, replaces some of them with members of a specially-designed set of query tokens called QA-Tokens. As a simple example, the PLACE$ token is substituted for the word "where". The premise of this procedure is that a quite high percentage of questions can be analyzed in such a manner.

The text collection from where the answer is to be derived is also augmented with QA-Tokens, but by using a different recognizer than that used to analyze the question. The search engine indexing process is modified to identify potential answers to questions (e.g. places, people, numeric quantities etc.) and index them. The scoring function is modified to score individual sentences, or small sequences of sentences, and return these to the user.

The invention uses one or more of the following observations:

(1) The answers to many questions issued against collections of text documents can be found in noun, prepositional and adverbial phrases, (2) These phrases can be typed by a set of a dozen or so labels (such as PERSON$, PLACE$, MONEY$), (3) A large percentage of questions can be classified and mapped to these phrase types (e.g. a "where" question is seeking a PLACES), and (4) For many questions, all or nearly all of the question terms will be found clustered in passages of just one or a small number of sentences, in those documents that answer the question.

The key consequence of the prominence of phrases is that, for the most part, phrases can be detected in text with a relatively simple pattern-matching algorithm, certainly a requirement that falls far short of full natural-language understanding. The implementation of the solution is expressed in modifications to three of the components of a traditional search engine solution, namely query-analysis, text parsing and indexing, and scoring.

The query analysis is enhanced by developing a set of question-templates that are matched against the user's query, with substitution of certain query terms with special query-tokens that correspond to the phrase labels mentioned above. So for example, the pattern "where . . . " causes the word "where" to be replaced with PLACE$. The pattern "how much does . . . cost" causes those terms to be replaced with MONEY$. The pattern "how old . . . " causes a replacement with AGE$. The base set of such labels is: PLACE$, PERSON$, ROLE$, NAME$, ORGANIZATION$, DURATION$, AGE$, DATE$, TIME$, VOLUME$, AREA$, LENGTH$, WEIGHT$, NUMBER$, METHOD$, MOST$, RATE$ and MONEY$. More specific versions of these, such as STATE$, COUNTRY$, CITY$, YEAR$ can be used as long as the phrase analyser (discussed below) can recognize such quantities.

A synonym operator @SYN( ) is used to deal with cases where a question could be validly matched against more than one type of phrase. Thus a "who" question could match a proper name, a profession or an organization, so will generate @SYN(PERSON$, ROLE$, ORGANIZATION$) in the modified query.

The indexer runs its own pattern template matcher against the text in the documents to be indexed. For each of the phrase types, a set of patterns needs to be developed. For example, the following are some of the TIME phrases:

in the afternoon
  in the morning
  . . .
  in :CARDINAL hours (where :CARDINAL is a cardinal number), and so on. Clearly to avoid a huge list (consider that instead of "hours" in the last example, almost any word indicating a period of time could be substituted), a mechanism for concisely expressing such variants and for efficient performance of the matching is desirable. This is the subject of a companion disclosure "An Efficient and Flexible Phrase Recognizer", but is not required for the correct functioning of the present invention.

Whenever the indexer succeeds in matching a phrase pattern template in text, the corresponding special query token (such as TIME$ or PLACE$) is generated and indexed at that point in the document, along with the individual terms that comprised the phrase. We call this process of adding extra indexing terms augmentation. All terms in the document not matched in this way are indexed in the usual way too.

The search engine operates essentially by the usual bag-of-words matching technique, but is subtly affected by the presence of the special query tokens. Thus the query: "When did the Challenger explode" gets translated on query analysis to the bag {@SYN(TIME$, DATE$) Challenger explode} which matches best against locations in the index that contain (exactly or variants of) the word Challenger, the word explode and either a TIME$ or a DATE$ token, meaning some phrasal expression of a time or date. The special Query Token is not allowed to match against any text token that is already matched against another query term. Thus the question is "Who was Napoleon's wife" will match against a passage containing "Napoleon", "wife" plus some term other than Napoleon that is augmented with PERSON$.

The final mentioned improvement is to the scoring algorithm. Search engines usually score documents based on how many of the query terms they contain and how often, combining contribution weights computed for each term based on document and collection-based statistics. It is our observation that when a document successfully answers a question, all of the components of the question are to be found together, usually within a sentence or two. Thus we modify the scoring algorithm to score sentences (or short sequences of them) rather than documents. Due to the more severe filtering constraints imposed by this (i.e. that all, or most, query terms must occur in a sentence or short sequence of them, rather than the document as a whole), then a less complicated scoring function will likely suffice—for example, a simple count of the number of query terms that matched.

This scoring procedure can be made more sophisticated and more flexible by extending the query syntax to allow specification of weights to individual query terms; on matching, the terms will contribute to the sentence or sentence-sequence score in proportion to the given weight. This will allow more precise scoring by taking care of the following kinds of considerations: Proper names and other multi-word terms in the query are rarer than individual words and so their presence in answer sentences gives more confidence that the sentence is correct that the presence of single terms from the query, all other things being equal, so should be weighted higher.

Proposed answer text is no answer if it doesn't contain a type-compatible match to a special query-token in the query, so special query tokens should be weighted higher than any other words in the query.

Some of the alternatives in the @SYN-sets may be more desirable than others. For example, "when" might generate @SYN(TIME$, DATE$), where DATE$ matches specific dates (e.g. "Jul. 4, 1776") but TIME$ matches more general expressions ("in the afternoon"); a DATE$ match is therefore usually more desirable than a TIME$ match so should be weighted more.

It is a question of user preference, to be determined, how the user interface presenting the results should look. In one design, document titles are returned in a browser as in a traditional hit-list, but the document's score is inherited directly from its best-achieving sentence (or sentence-sequence). On clicking on the document title, the document is fetched, and scrolled to the location of the target sentence, highlighting the sentence through colour, font, point-size, shading or other markings. In another design, the hit-list consists of the best-matching sentences. Clicking on them fetches the documents they belong in, as before.

A more detailed description of the invention is now presented in relation to the Figures.

FIG. 1 is a block diagram of the computing environment in which the present invention is used in a non-limiting preferred embodiment. The figure shows some of the possible hardware, software, and networking configurations that make up the computing environment.

The computing environment or system 100 comprises one or more general purpose computers 170, 175, 180, 185, 190, and 195 interconnected by a network 105. Examples of general purpose computers include the IBM Aptiva personal computer, the IBM RISC System/6000 workstation, and the IBM POWERparallel SP2. (These are Trademarks of the IBM Corporation.) The network 105 may be a local area network (LAN), a wide area network (WAN), or the Internet. Moreover, the computers in this environment may support the Web information exchange protocol (HTTP) and be part of a local Web or the World Wide Web (WWW). Some computers (e.g., 195) may occasionally or always be disconnected 196 from the network and operate as stand-alone computers.

In a preferred embodiment, the present invention is implemented as a software component in the computing environment. The software component is called the Question Answering System 110. The Question Anwering System answers questions by processing information contained in documents 140. Documents 140 are items such as books, articles, or reports that contain text. One or more documents are stored on one or more computers in the environment. One or more documents may be grouped together to form a document database 141. A document database 141 may comprise documents located anywhere in the computing environment, e.g., spread across two or more computers. The Question Answering System analyzes the documents in a document database (see FIG. 7) to create an index 130 for the document database (see FIG. 6).

User questions are represented as queries (see FIG. 5) and submitted to a Question Answering System 110 for processing. The Question Answering System uses system data 120 (see FIGS. 3 and 4) and an index 130 to process the query and locate relevant text passages in documents 140 (see FIG. 8). The relevant text passages may be further analyzed by the Question Answering System to identify specific answers to the question (see FIG. 9), and the results are returned to the user.

Documents 140, indexes 130, and/or system data 120 on one computer may be accessed over the network by another computer using the Web (http) protocol, a networked file system protocol (e.g., NFS, AFS), or some other protocol. Services on one computer (e.g., question answering system 110) may be invoked over the network by another computer using the Web protocol, a remote procedure call (RPC) protocol, or some other protocol.

A number of possible configurations for accessing documents, indexes, system data, and services locally or remotely are depicted in the present figure. These possibilities are described further below.

One configuration is a stand-alone workstation 195 that may or may not be connected to a network 105. The stand-alone system 195 has documents 140, system data 120, and an index 130 stored locally. The stand-alone system 195 also has a question answering system 110 installed locally. When the system is used, a question is input to the workstation 195 and processed by the local question answering system 110 using system data 120 and the index 130. The results from the question answering system are output by the workstation 195.

A second configuration is 185, a workstation with documents, system data, and indexes connected to a network 105. This configuration is similar to the stand-alone workstation 195, except that 185 is always connected to the network 105. Also, the local index 130 may be derived from local documents 140 and/or remote documents accessed via the network 105, and created by either a local question answering system 110 or a remote question answering system 110 accessed via the network 105. When queries are input at the workstation 185, they may be processed locally at 185 using the local question answering system 110, local system data 120, and local index 130.

Alternatively, the local question answering system 110 may access remote system data 120 and/or a remote index 130 (e.g. on system 175) via the network 105. Alternatively, the workstation 185 may access a remote question answering system 110 via the network 105.

Another possible configuration is 175, a workstation with an index only. Computer 175 is similar to computer 185 with the exception that there are no local documents 140. The local index 130 is derived from documents 140 accessed via the network 105. Otherwise, as in computer 185, the index 130, system data 120, and question answering system 110 may be accessed locally or remotely via the network 105 when processing queries.

Another possible configuration is computer 180, a workstation with documents only. The documents 140 stored locally at computer 180 may be accessed by remote question answering systems 110 via the network 105. When queries are entered at computer 180, the question answering system 110, system data 120, and index 130 must all be accessed remotely via the network 105.

Another possible configuration is computer 190, a client station with no local documents 140, index 130, system data 120, or question answering system 110. When queries are entered at computer 190, the question answering system 110, system data 120, and index 130 must all be accessed remotely via the network 105.

Another possible configuration is computer 170, a typical web server. Queries are entered at another workstation (e.g., 175, 180, 185, or possibly 195) or a client station (e.g., 190) and sent for processing to the web server 170 via the network 105. The web server 170 uses a remote question answering system 110, system data 120, and index 130 (accessed via the network 105) to process the query. Alternatively, one or more of these functions (110, 120, and 130) can reside on the web server 170. The results are returned to the workstation or client station from which the query was originally sent.

This general process of indexing is well known in the prior art, but new details are disclosed in this invention in both the indexing and search processes that are especially suited to question-answering.

Figure 2:
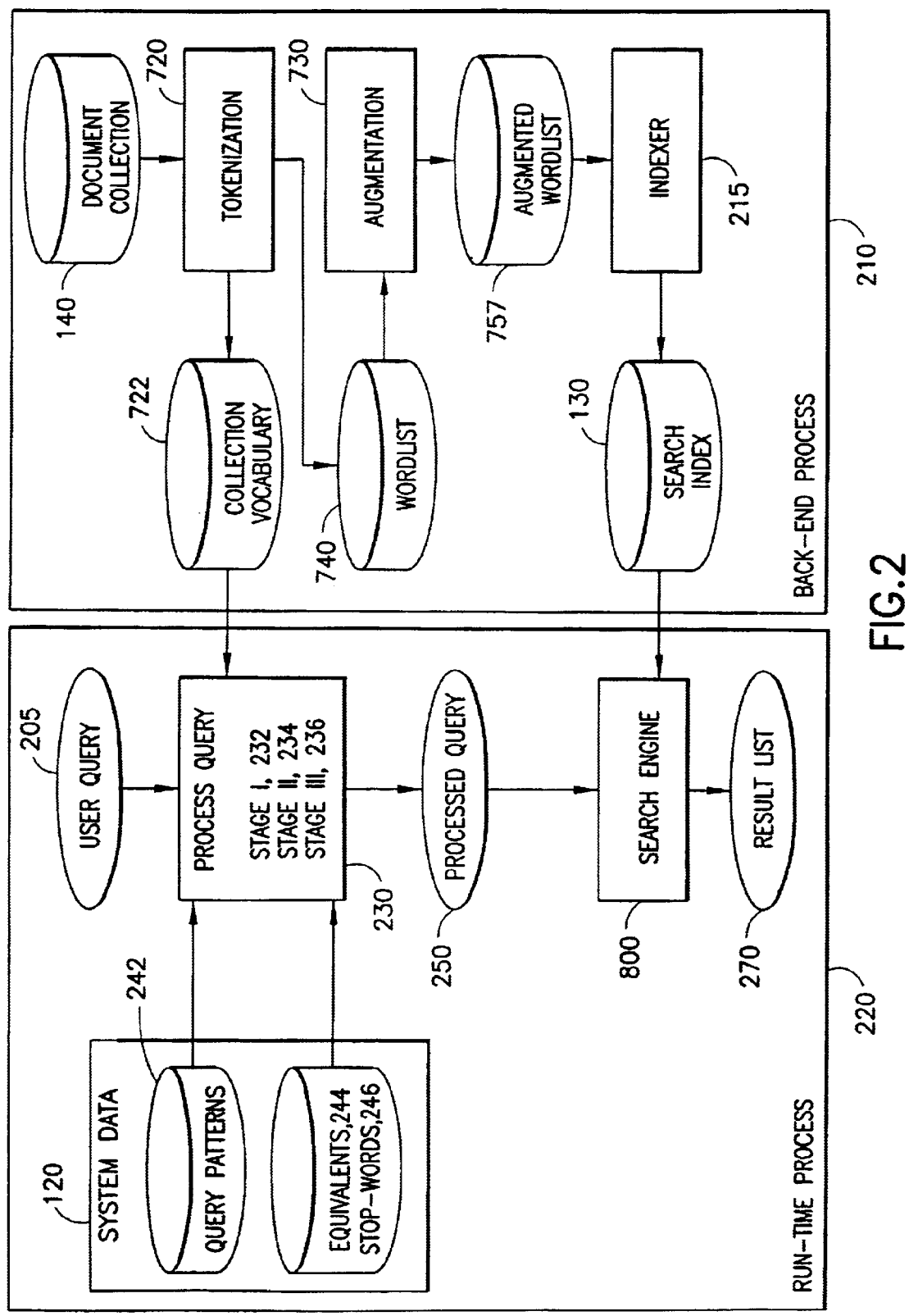
FIG. 2 is a block diagram of the system architecture.

There are conceptually two parts to the system described in this invention. FIG. 2 shows the back-end process 210 in which the document collection is processed into indexes, and a run-time system 220 which takes a user's question and returns answers by reference to the indexes produced by the back-end system. We first provide an overview of these processes, then a detailed description.

In the back-end process 210 the document collection 140 is tokenized by Tokenizer 720 which produces a Word-List 740 and a Collection Vocabulary 722. The Word-List 740 is processed by Augmentor 730 producing an Augmented Word-List 757. The Augmented Word-List is input to Indexer 215 which produces Index 130.

The run-time system 220 takes as input the user's input 205, which is a text string representing the user's information need in natural language. This is processed by the Query Processor Stage I 232 with reference to a set of query patterns 242 and equivalents 244. The output of this process is a modified text string 245. This string 245 is further manipulated by Query Processor Stage II 234 which by reference to a collection-dependent vocabulary file 722 and stop-word list 246 produces a further-modified query 247. This query 247 undergoes a final transformation in Query Processor Stage III 236 whereby operators directing the search (such as indicating window-size) are inserted, and a search-ready query 250 is produced.

The search-ready query 250 is then submitted to the search engine process 800 which by reference to search index 130, previously generated by indexing process 215, produces a document hit-list 270. The document hit-list contains a rank-ordering of the documents that contain the best passages that match the query, each entry containing, amongst other information, the offset in the document where the relevant passage is found. This hit-list is presented to the user.

The Augmentation process 730 and the Query Processing 230 operate on a collection of QA-Tokens 765 which are labels for different question types and the corresponding text segments in the document collection. A useful, but not necessarily complete, list of such tokens used in a preferred embodiment, along with an example of each, is presented here:

| | |
|---|---|
| PLACE$ | In the Rocky Mountains |
| COUNTRY$ | United Kingdom |
| STATE$ | Massachusetts |
| PERSON$ | Albert Einstein |
| ROLE$ | doctor |
| NAME$ | the Shakespeare Festival |
| ORG$ | the US Post Office |
| DURATION$ | for 5 centuries |
| AGE$ | 30 years old |
| YEAR$ | 1999 |
| TIME$ | in the afternoon |
| DATE$ | July 4th, 1776 |
| VOLUME$ | 3 gallons |
| AREA$ | 4 square inches |
| LENGTH$ | 3 miles |
| WEIGHT$ | 25 tons |
| NUMBER$ | 1,234.5 |
| METHOD$ | by rubbing |
| RATE$ | 50 per cent |
| MONEY$ | 4 million dollars |

We now describe process 230 in which the user's query 205 is analyzed and transformed into a format suitable for submission to the search engine process 800.

Figure 4:
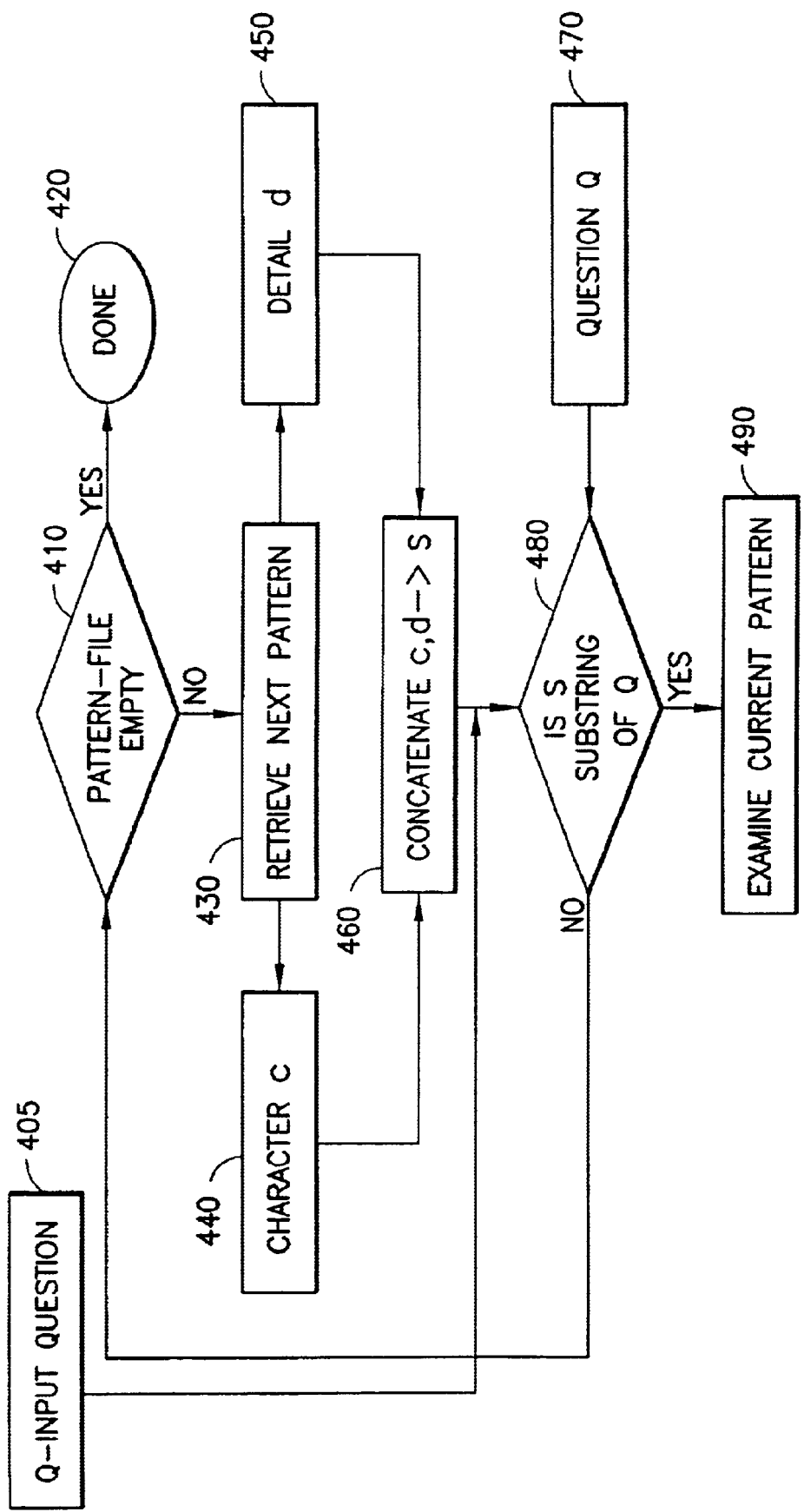
FIG. 4 is a flow chart of the Matching Algorithm
Figure 5:
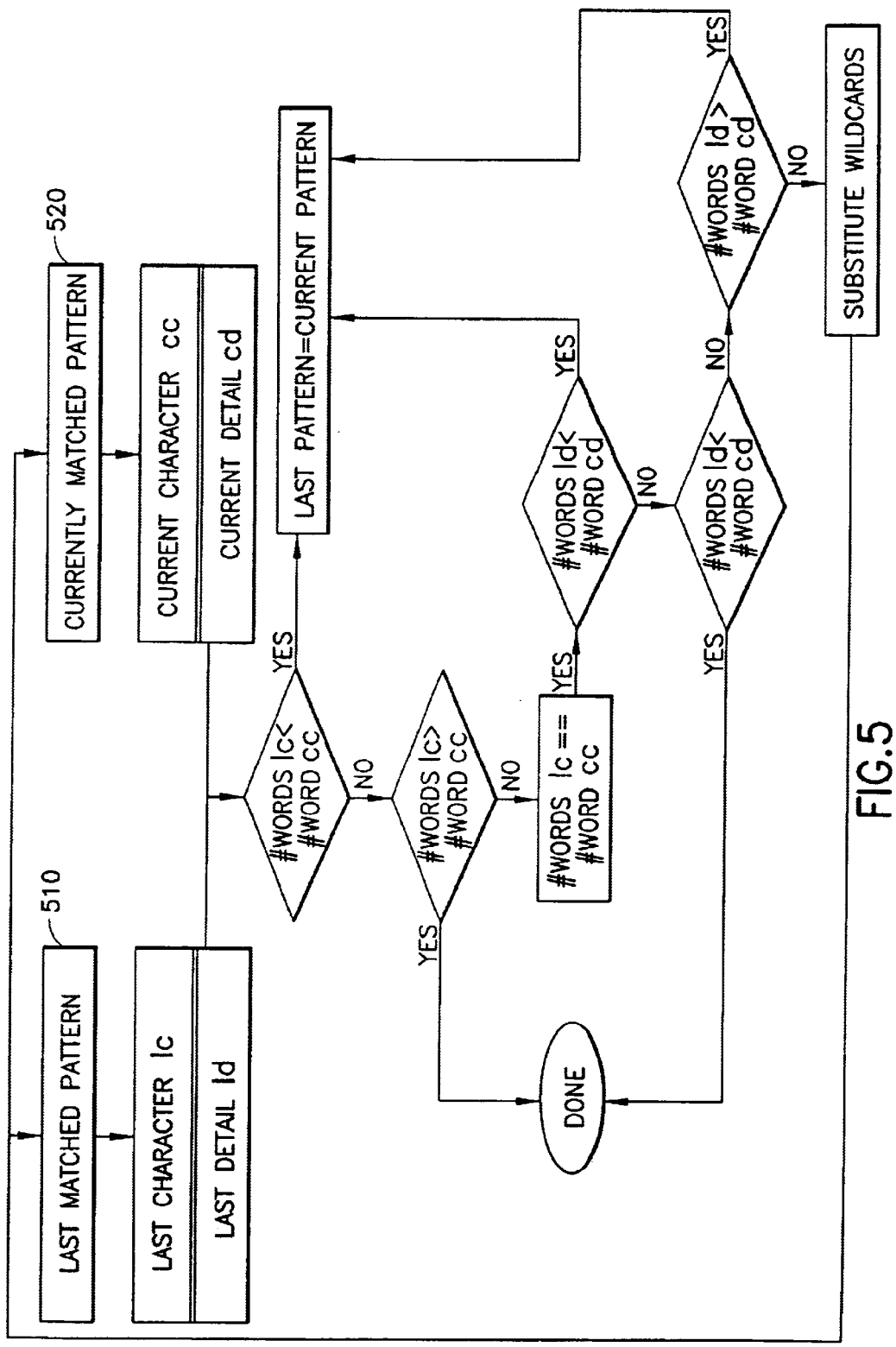
FIG. 5 is a flow chart of the Priority Algorithm.

FIGS. 3, 4 and 5 support the description of how a given question is analyzed and modified before being submitted to a corpus in search of an answer. The premise is that using advanced textprocessing methods, certain words, phrases or relations can be identified within a corpus. For instance the phrase President Lincoln can be identified as a NAME of a person, from the sentence "Lou Gerstner is the CEO of IBM" it can be deduced that Lou Gerstner and IBM have a relation—which is "CEO". The identification of a word, phrase and relationship is discussed in depth in the literature. However, some additional extensions are also covered in this disclosure. Throughout this disclosure such identifications are referred to as QA-Tokens [765]. The main idea disclosed here is the following: Suppose the system can automatically determine that the answer to a given question is one or more of the special QA-Tokens [765]. Then submitting a bag of words which consists of the QA-Tokens [765]and some (all) of the words in the question (which is discussed in more detail later in this section) to the corpus for search will result in a set of text fragments containing the answer. The search itself and the determination of the answer is discussed in FIG. 8. The issues of determining a single answer phrase from a set of returned text passages is not covered by this disclosure.

The processing 230 of user input 205 to prepare it for submission to the search engine 260 proceeds in three stages.

Query Processing Stage I-232.

In this section it is outlined how to analyze a question phrased in plain English. The outcome of such an analysis is a "bag of words" consisting of a set of set of QA-Tokens [765] and some of the words in the question. These are steps in the analysis:

1) Determine the set of QA-Tokens [765] which describe the answer.
2) Determine which words of the questions should be submitted to the search
3) Determine which other words/phrases are relevant to be submitted to the search

STEP 1

Previously, a non-exhaustive list of QA-Tokens [765] used in the system was enumerated. To determine a set of QA-Tokens [765] which describe the answer to a question a Patterns-file [310] is used. A preferred embodiment of such a Patterns-file [310] is shown in FIG. 3.

The data in the Patterns-file[310] is organized in six columns. Only columns 330 and 332 are required to contain data, the rest of the columns 331, 334, 336, 338 can be empty. Each of the columns is described in turn. There is no limit on the number of rows in 320. FIG. 3 shows six different row pattern types which can be repeated unlimited number of types and are just examples of many different possible patterns.

The first column 330 in FIG. 3 labelled QA-Token [765] and captures the type of answer a question is stipulated to have. Entries in this column could be a single QA-Token [765] or a set of QA-Tokens [765] as a question could stipulate more than one type of answer. For example, the answer to a question starting with "Name . . . " could be a person, an organization or anything else which has been named. In cases where a set of multiple QA-Tokens [765] are possible answer tokens they are grouped together. A preferred embodiment to denote this grouping is by enclosing the equivalent QA-Tokens [765] with parenthesis and prefixing it with the operator @SYN. Column 331 describes a weight for the different QA-Tokens [765] as described in the first column 330. The weight of each QA-Token [765] defaults to 1 if it is not specified. Otherwise, the order of the weights in the second column corresponds to the order of the QA-Tokens [765] in the first column. These weights may be used in subsequent steps of the process described in the disclosure, like the search process itself or the finding of the most appropriate answer from the hit list.

How is it determined which QA-Tokens[765] are the appropriate ones to capture the answers to a given question?

FIG. 4 shows one preferred embodiment of the algorithm. The Pattern-file [310] as described in FIG. 3 is the input as is shown box 410 as is the question Q as shown in box 405. Once the Pattern-file[310] is empty the algorithm terminates in box 420. In case the Pattern-file[310] is not empty, the next pattern is retrieved in box 430 from the pattern file. The Character c in column 332 of that pattern is determined in box 440, and the Detail d in column 334 of that pattern is determined in box 450. In box 460 c and d are concatenated leaving a blank space in between and forming a string S. The original question Q is shown in box 470. The actual matching occurs in box 480 where it is tested whether S is a substring of Q. Note that both the Character c and the Detail d could contain a special symbol. In this preferred embodiment the symbol is a ".". This symbol is a "wildcard", it can stand for an arbitrary number of characters (including no character at all). If S is a substring of Q it is determined whether the current pattern or a previously matching pattern should be retained. This is shown in box 490. The detail of box 490 are shown in FIG. 5 which is the priority algorithm.

FIG. 5 describes the Priority Algorithm which is applied if two different patterns match a given question. For example there could be two patterns:

YEAR$ | what year

NAME$ | what

Suppose the question to be analyzed is "In what year did Mozart compose Eine kleine Nachtmusik". Following the algorithm as described in FIG. 4, both patterns would match. Clearly, the pattern YEAR$ | what year is the more desirable pattern as the token YEAR$ captures the essence of the question. Hence a general Priority Algorithm is needed. The conflict resolution is between the last pattern 510 matched and the currently matched pattern 520. The last pattern 510 matched is initialized in the beginning to an empty string. The Character and the Detail parts of the two patterns are compared. Note that the wildcard characters are retained in the Character and the Detail. However, this resolution algorithm needs to be expanded as the following example shows:

The question is: What is the capital of this district?

The two patterns which match are:

CAPITAL$ what|.capital

@SYN(PLACE$, NAME$) what|.district

In this case the above described algorithm just exploring the number of words in the Character and Detail not including the wildcards does not resolve the issue. In this case, when the number of words of the Character and the number of words in the Detail are the same, the whole question has to be explored which means that the words of the question have to be substituted in the Character and the Detail part. After that has been performed the number of words in the Character and the detail have to be explored:

Character 1: what

Detail 1: is the capital

Character 2: what

Detail 2: is the capital of this district

The same algorithm as described in FIG. 5 is applied to these character and detail strings and a resolution is guaranteed. After the words have been substituted in the character and the detail the number of words have to be different in either the characteristic or the detail part:

Explanation

For a question to match two different patterns and the character and the detail of the two patterns having the same number of words, the patterns have to contain wildcards. The question itself would first match on the first word it encountered in the pattern and then the second. Hence the count of words would differ in this case.

The columns Remove 336 and Add 338 in the Patterns-File as shown in FIG. 3 are explained now. At this stage, it was determined which pattern matches a given question the best and it will be referred to as P1. If the Remove column 336 contains a string R1, it is now removed from the P1 string. In case that the Add column 338 contains a string S1, S1 is added to the P1 string.

In the Patterns-File 310 [FIG. 3] some of the strings have a special symbol "" as a prefix which will be explained later on in this section.

STEP 2:

In this step it is determined which part of the question should be submitted to the search engine. At this point a "best-match" pattern has been determined and if the Remove 336 and Add 338 columns were specified the appropriate substitutions made. Furthermore, the original question can be parsed into four parts. The characteristic part, which matches the Character of the pattern, the initial part which is that part of the question preceding the characteristic part (and which can be the null string), the detail part which matches the Detail of the pattern and the tail part which is that part of the string which follows the detail part. The question which gets submitted for further processing in the next couple of steps is the concatenation of the initial part, the QA-Tokens [765] as determined by the "best-match" pattern, the detail and end parts. In essence the characteristic part of the question gets replaced by the appropriate QA-Tokens [765], a fact which has to be taken into account when designing the Pattern-File [FIG. 3].

STEP 3

In this step it is discussed how to address synonyms, canonical forms and related phrases. Synonyms are words or phrases which mean the same. For example, a question may use a certain phrase, the text from where the answer is to be gotten may use a different phrase. To address this issue, the Remove and Add columns as described in the Patterns-File [FIG. 3] where introduced. However, there is a different angle to synonyms too. Several patterns could be the same, except for a single word or phrase. For example: The two questions: What is the salary? or What is the compensation? beg for the same type of answer (and hence QA-Token [765]) which is MONEY$.

Figure 5A:
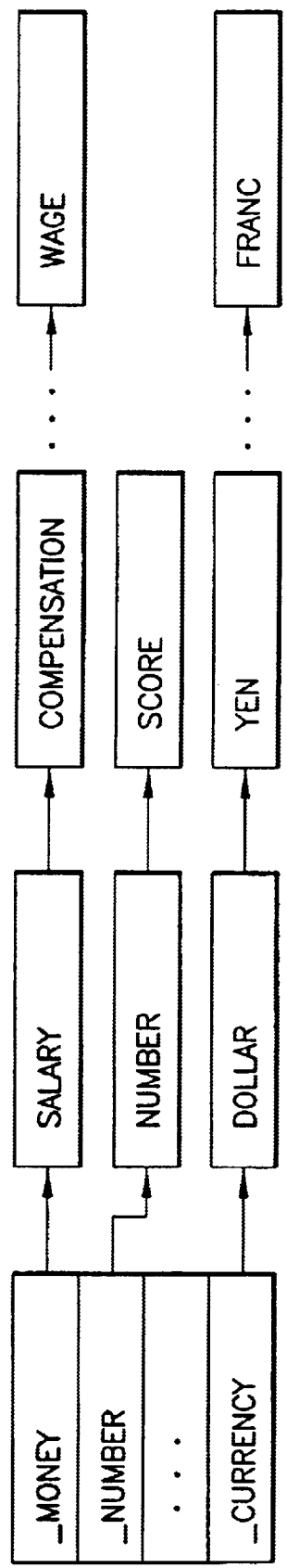
FIG. 5a is a block diagram of the Equivalence File.

Toward this end a preferred embodiment of an Equivalence File is shown in FIG. 5a. The first column has strings which start with an "" underscore symbol and is referred to as the type. It points to a linked list of strings which are all equivalent. In the Patterns-File [FIG. 3], the pattern "MONEY$ how much salary" is denoted as "MONEY$ how much_money" to use the example in FIG. 5a. Hence the question Q as shown in box 405 in FIG. 4 is not the original question as posed by the user but is preprocessed. It checks whether a word in the question is a member of any of the linked lists, if so, it replaces the word by its type. In one preferred embodiment, the data is not stored as a set of linked list but as an associative array. Using that data structure, the "lookup" of the type of a word can be done efficiently.

Query Processing Stage II-234

An aspect of the system is that the type of analysis on the question is in sync with the type of analysis done on the corpus of text where the answer is found. Towards this end the following steps are performed in the question analysis if they are performed in the indexing part:

1) find the lemma form of a given word 2) find all the equivalent canonical forms of a word or set of words In case there are several canonical forms for a given phrase, they are enclosed with the same @SYN( ) operator as the equivalent QA-Tokens[765]) to make processing by the back end easier.

Another file used in the processing of the question is the stop word file [246]. This is just a plain file consisting of words which should be eliminated from a question as they would not add any additional information and may actually skew the search results. Typical examples are "and, or, is, have, the". Words which are mentioned in the stop word file [246] are removed from the question.

Another file, the collection vocabulary file [722] is used in the system. Such a file is created using a vocabulary file created during indexing time, which contains all the words and some relevant statistics of the words in the collection. Using a set of rules a collection vocabulary file creator determines which words are equivalent. For example, it may determine that President Bill Clinton and President William Jefferson Clinton are the same person. The query analyzer can then take each word in the query and determine from the collection vocabulary file [722] all its equivalent words.

When submitting a bag of words as previously described to the search engine, all the equivalent words enclosed in a @SYN operator are submitted too.

Query Processing Stage III-236

We describe here the final pre-processing of the query. This stage consists of attaching weights to query terms and to specifying the text window within which the search engine 260 is to operate.

There are many possible ways to indicate weighting. A preferred embodiment is to use the @WEIGHT operator which takes a weight and a terms as arguments. Thus to specify that the word "computer" in a query has weight N, the term in the query becomes @WEIGHT (N computer). There are many possible weighting schemes described in the literature, mostly employing term-frequency and inverse-document frequency calculations. A preferred weighting scheme for our invention is as follows.

QA-Tokens are assigned a weight of 4

Proper names are assigned a weight of 2 all other query terms are assigned a weight of 1.

A preferred embodiment of specification of window size that is uniform with the @SYN and @WEIGHT syntax is to use the @WINDOW operator. The first argument N is the window size, the second is the entire query. A possible modification of this scheme is to specify that the window is dynamic-N, which will cause the search engine to try all window sizes from 1 up to N. This is so that if all query terms that match within a window of size N sentences actually fall within a sub-window of M<N consecutive sentences then the smaller window match will be the one returned to the user.

Another modification of this scheme is to allow the user to specify that matching be exclusive—that is that any QA-Token in the query does match a term in text that already matches some other query term. A preferred embodiment of this specification is to use the @EXECWIN operator instead of the @WINDOW operator. As an example of all of these features operating together, suppose that the user's original query is "Who was the wife of Napoleon?". Suppose a dynamic exclusive window of size 2 is desired. Then the output of the Query Processing will be: @EXECWIN (dynamic-2 @WEIGHT(4 @SYN(PERSON$ NAME$)) @WEIGHT(1wife) @WEIGHT(2 Napoleon))

Figure 6:
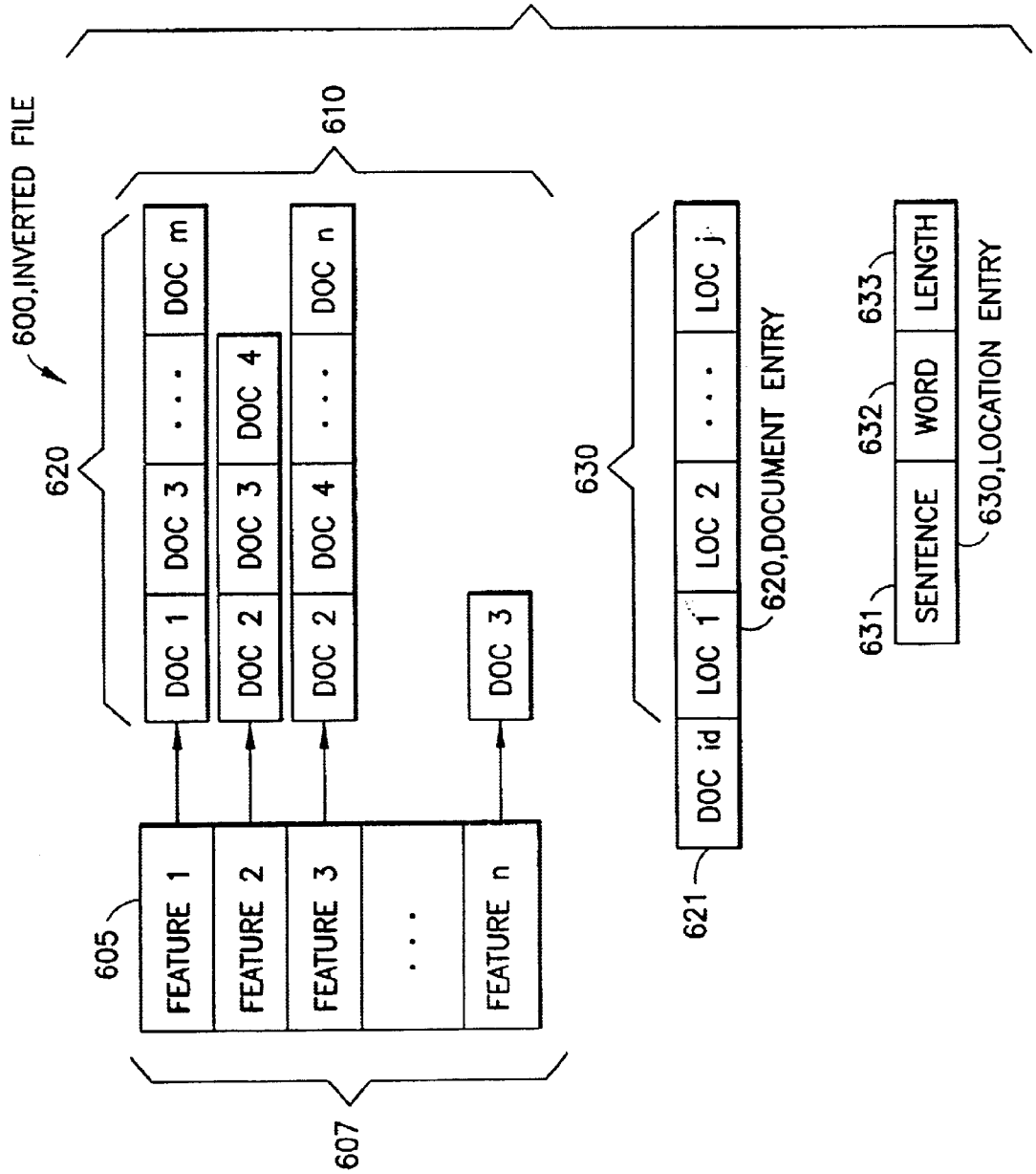
FIG. 6 is a block diagram of a text index data structure.

FIG. 6 is a block diagram of an index 130, which, at a minimum, consists of an inverted file 600. An inverted file 600 contains an inverted list 610 for every indexable feature identified during document analysis (see FIG. 7). An inverted list 610 contains a document entry 620 for every document in which the corresponding feature appears. A document entry 620 contains a document identifier 621 that identifies the corresponding document, and a location entry 630 for every occurrence of the feature in the document. A location entry 630 identifies where in the document the feature occurs, and includes a sentence number 631 identifying the sentence, a word number 632 identifying the word in the sentence, and a length 633 indicating how many words make up the feature. The features 607 in an inverted file 600 are typically organized in a dictionary 605, which allows the inverted list 610 for a particular term 607 to be accessed.

FIG. 7 is a flowchart showing the method steps for document analysis in one preferred embodiment of the present invention.

Prior to being indexed, the text undergoes a process of Augmentation via pattern-matching. This is performed by well-known techniques in the prior art such as string-matching and processing by finite-state-machines (FSMs). These operations are not described in detail here, but the data-structures used as reference and those produced as output are described.

Figure 7A:
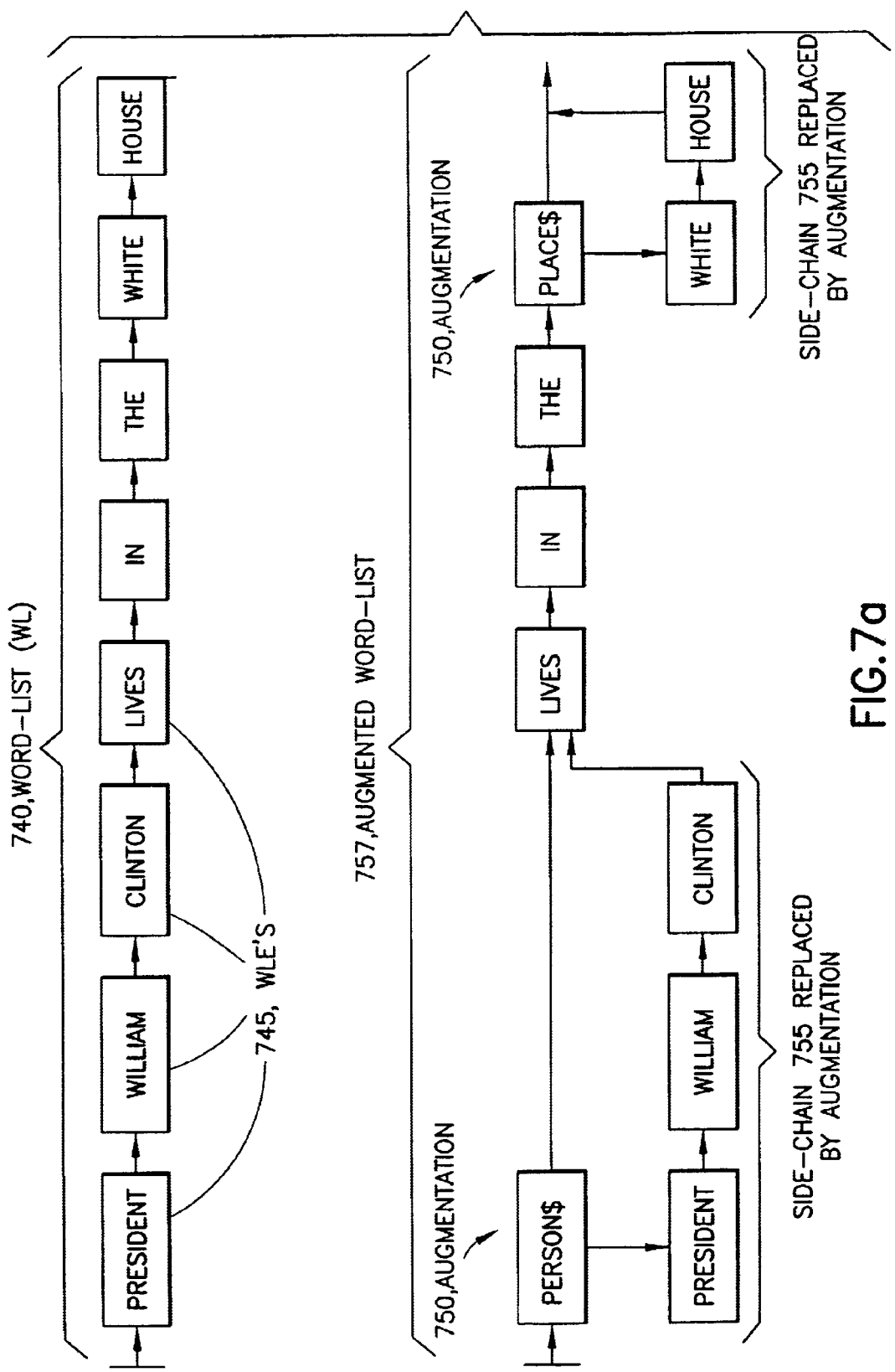
FIG. 7a is a diagram of a text data structure.

The first stage of the back-end process 710 is Tokenization 720 which extracts the individual words from the input and assigns to them lexical features. A preferred embodiment of the output of this process is a linked Word List 740 of Word-List-Elements (WLEs) 745, with which are associated any properties that the Tokenizer system 720 can identify. Possible properties include but are not limited to: part-of-speech, whether capitalized, lemma form. The WLEs 745 are linked together in a standard linked-list fashion, but with the ability to accommodate Augmentations 750 on the linked list. An augmentation is simply a new fragment of the word-list 740 that replaces an existing fragment, but keeps the old fragment accessible as a side-chain 755. Two examples of augmentations are shown in FIG. 7a. Augmentations will be generated by the Augmentation process described below, and serve as a mechanism to label segments of the word-list 740. Augmentations may be applied to augmentations, if desired. A first round of augmentations may be generated by the Tokenizer 720 itself. For example, whole numbers may identified during tokenization and so labelled with the augmentation :CARDINAL. (The colon':' is merely a syntactic construct to avoid confusion with any instances of the actual word in text.) Thus any patterns 775 described below that involve cardinal numbers, say, may employ the identifier :CARDINAL to avoid having a specific pattern instance for every possible numerical value. It does not matter that a given pattern can match "bogus" text strings—for example, "at :CARDINAL o'clock" can match "at −57.56463 o'clock", since those text strings will rarely if at all occur, and if they do then what is expected of a system such as the present one is undefined.

The Augmentation process 730 takes as input a Word-List 740 and a QA-Token file 760. It is assumed that the Augmentation process has the capability of accepting one or more input patterns 775 and a text-stream 740, and identifying any and all locations in the text-stream 740 where instances of the patterns 775 occur. This is a standard capability of text parsers described in the prior art. The QA-Token file 760 consists of a number of records 762 each of which has two fields: a QA-Token 765 and a pointer or reference 767 to a QA-File. The QA-Token file consists of one or more patterns 775 written in whatever syntax the pattern-matcher in the Augmentor 730 requires. The QA-Token is the identifier used to mark the location and existence of the patterns 775. An example of a QA-Token file and two QA-Files are shown in FIG. 7b.

Figure 7B:
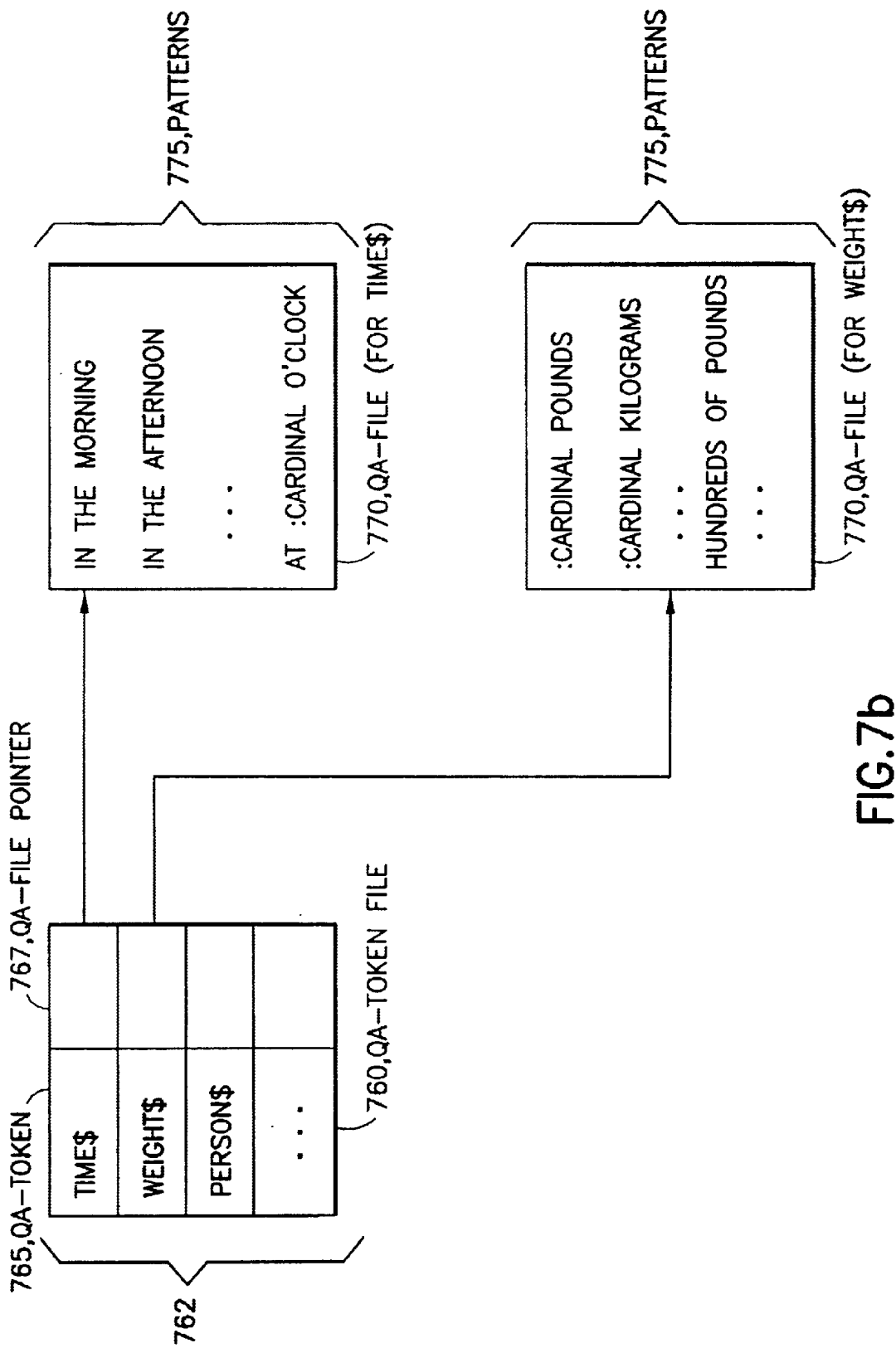
FIG. 7b is a diagram of pattern files.

It will be clear from the examples of patterns 775 shown in FIG. 7b that given the large number of different measurement systems (e.g. for TIME there are seconds, minutes, days, . . . , centuries, millennia, . . . microseconds . . . , and for WEIGHT there are pounds, ounces, tons, grams, kilograms and so on) that unless some steps are taken the number of patterns required will be enormous, especially if a given pattern requires two or more such entities. Therefore we anticipate a simple substitution scheme whereby variables, for discussion's sake indicated syntactically by a leading underscore ('`'), are defined to stand for a collection of base terms. Thus the variable_WEIGHT might be defined to stand for the set {pounds, ounces, tons . . . } and an individual pattern 775a might reference it by ":CARDINAL_WEIGHT", say, in so doing encoding all patterns that consist of a cardinal number followed by one of the given units of weight measurement. Such a mechanism is useful for efficiency, and is present in the preferred embodiment, but is not required for the correct operation of this invention. Implementation of a parser that can accept such variables in its patterns is standard in the prior art.

Figure 7C:
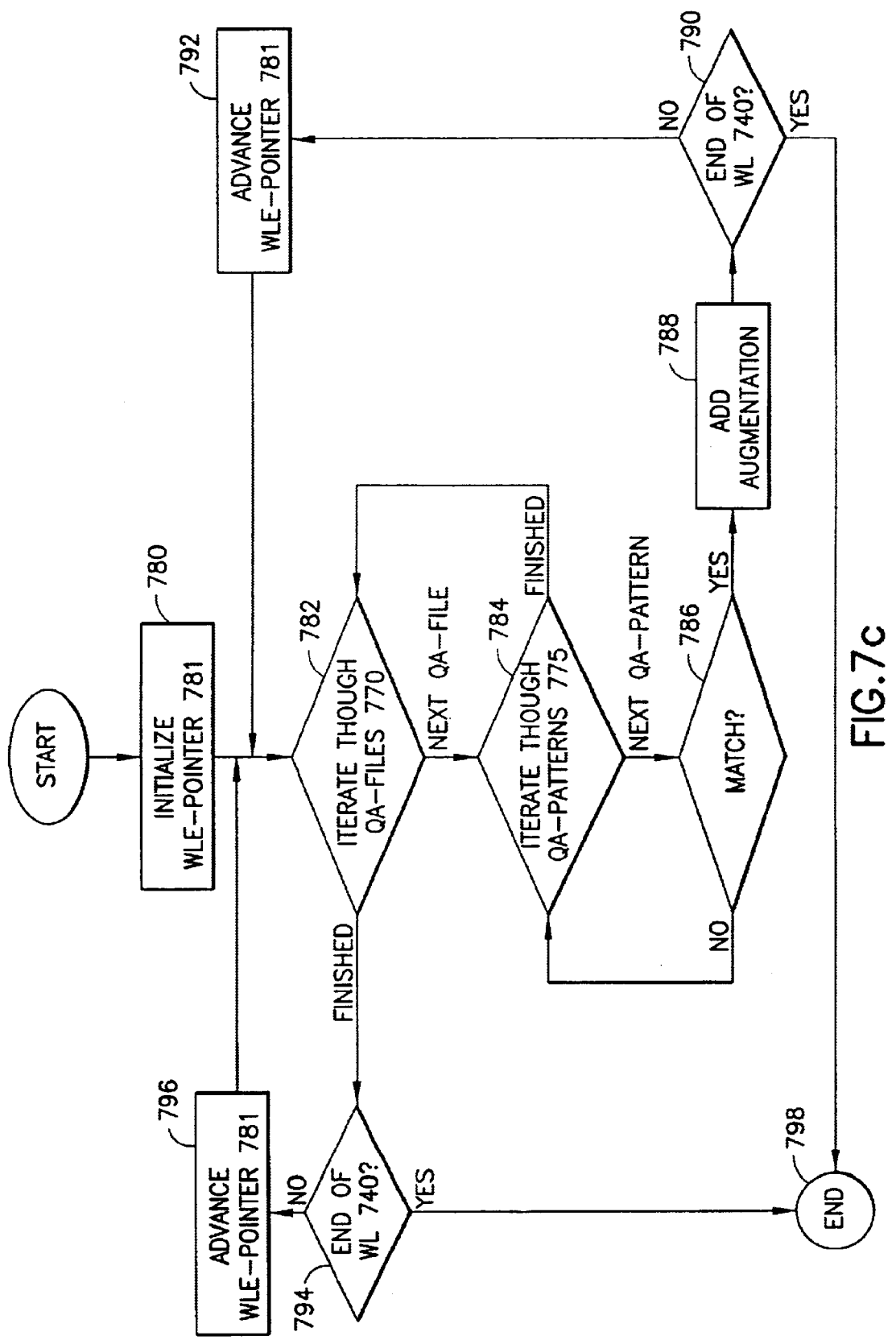
FIG. 7c is a flow chart of a document analysis process.

The operation of the Augmentation process 730 is depicted in FIG. 7c. In step 780, WLE-pointer 781 is set to point to the first WLE of Word-List 740. Step 782 iterates through all records 762 in QA-Token file 760. Suppose a particular record 762a is selected, consisting of QA-Token 765a and pointer 767a to QA-file 770a. Step 784 iterates through every pattern 775 in QA-file 770a in turn. Suppose a particular pattern 775b is selected. In step 786 the pattern-matcher 730 attempts to match pattern 775b with the Word-List 740 anchored at the point marked by the WLE-pointer 781. If a match occurs, step 788 is executed and an augmentation 755b is added to the Word-List at point 781, labelled with the current QA-Token 7765a. Step 790 is then executed in which it is tested to see if the Word-List Pointer 781 is at the end of the Word-List 740. If it is, then exit point 798 is reached, otherwise Word-List Pointer 781 is advanced (step 792) and the execution returns to step 782. If in step 786 no match occurs, step 784 continues to iterate through all patterns 775. If step 784 completes with no match, step 782 continues the iteration though all QA-token files 760. When the iteration in step 782 is finished, step 794 is executed to see if the Word-List pointer 781 is at the end of the Word-List 740. If it is, then exit point 798 is reached, otherwise Word-List Pointer 781 is advanced (step 796) and the execution restarts step 782. The output of this process is an Augmented Word-List 757.

The use of a linked list with side-chains as an Augmented Word-List 757 is a preferred embodiment of a representation of features added to a sequence of text. Alternative means include, but are not limited to, markup such as XML. Thus the sentence depicted in FIG. 7a might become in XML:

<TEXT><PERSON>President William Clinton</PERSON>lives in the <PLACE>White House</PLACE></TEXT>.

The following process (see FIG. 7d) which takes as input the Augmented Word List 757 would be modified in a straightforward way to accommodate any different but functionally equivalent representation structure.

Figure 7D:
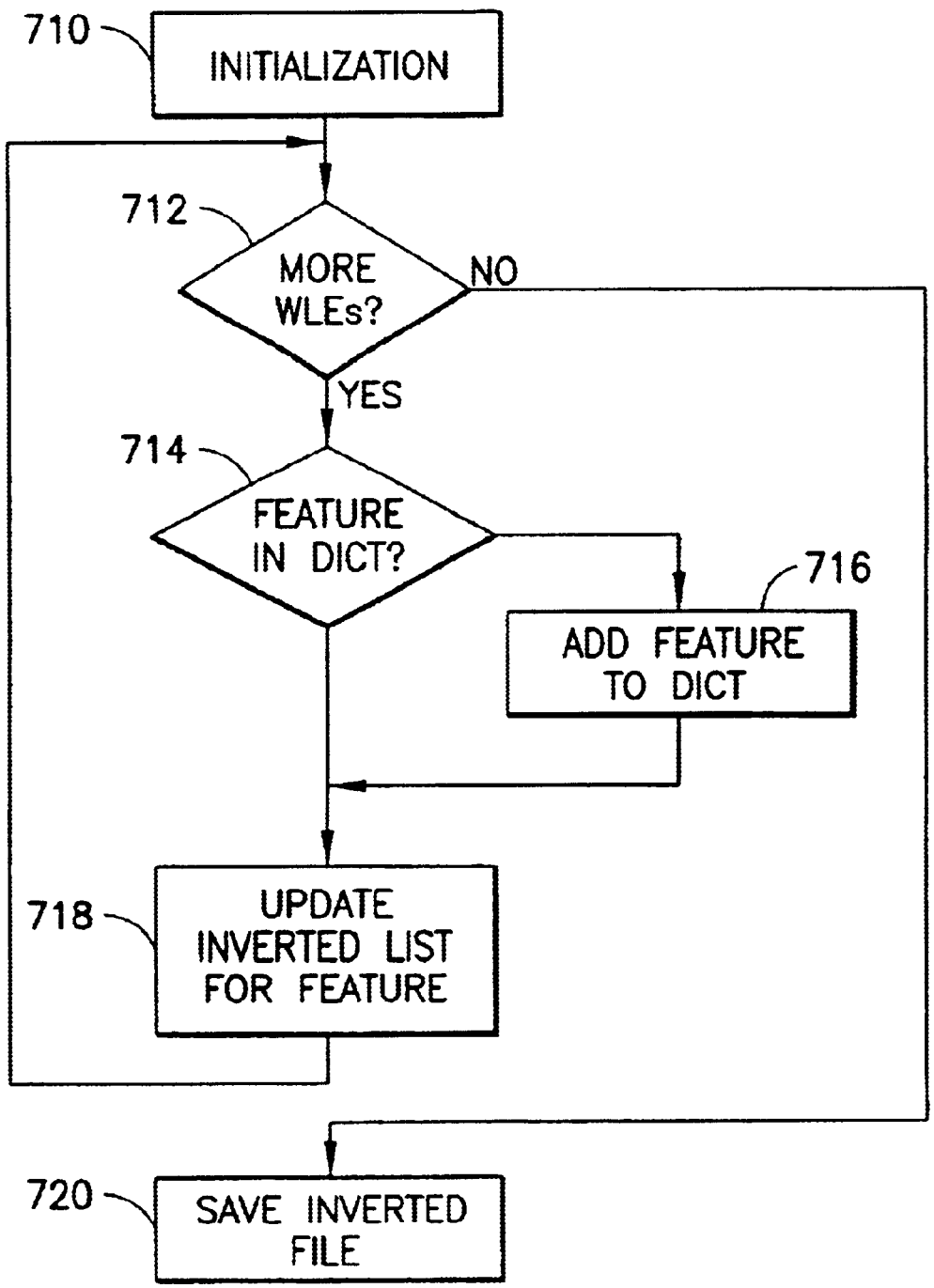
FIG. 7d is a flow chart of an indexing process.

The Inverted File 600 is built from the Augmented Word-List 757. This process is depicted in FIG. 7d. Step 710 initializes the process, setting the word list pointer to the first entry in the augmented word list. Step 712 iterates over each entry in the augmented word list. Every entry in the word list (tokens, augmentations, and QA-tokens) is considered an indexable feature. In each case, the "canonical form" of the indexable feature is used for indexing purposes (e.g., lemma form, QA-token string, etc.). In Step 714, the current word list entry is looked up in the Dictionary 605. If it is not found, a new entry for the indexable feature is created in the dictionary in Step 716. In Step 718, the Inverted List 610 for the current indexable feature is updated by adding a Location Entry 630 to the Document Entry 620 at the end of the inverted list. The location entry contains the sentence number 631, word number 632, and length 633 of the indexable feature. This information is obtained from the Word List-Entry 745 for the indexable feature. Processing then iterates at Step 712 until there are no more entries on the word list. Processing completes in step 720, where the updated Inverted File 600 is saved.

Figure 8:
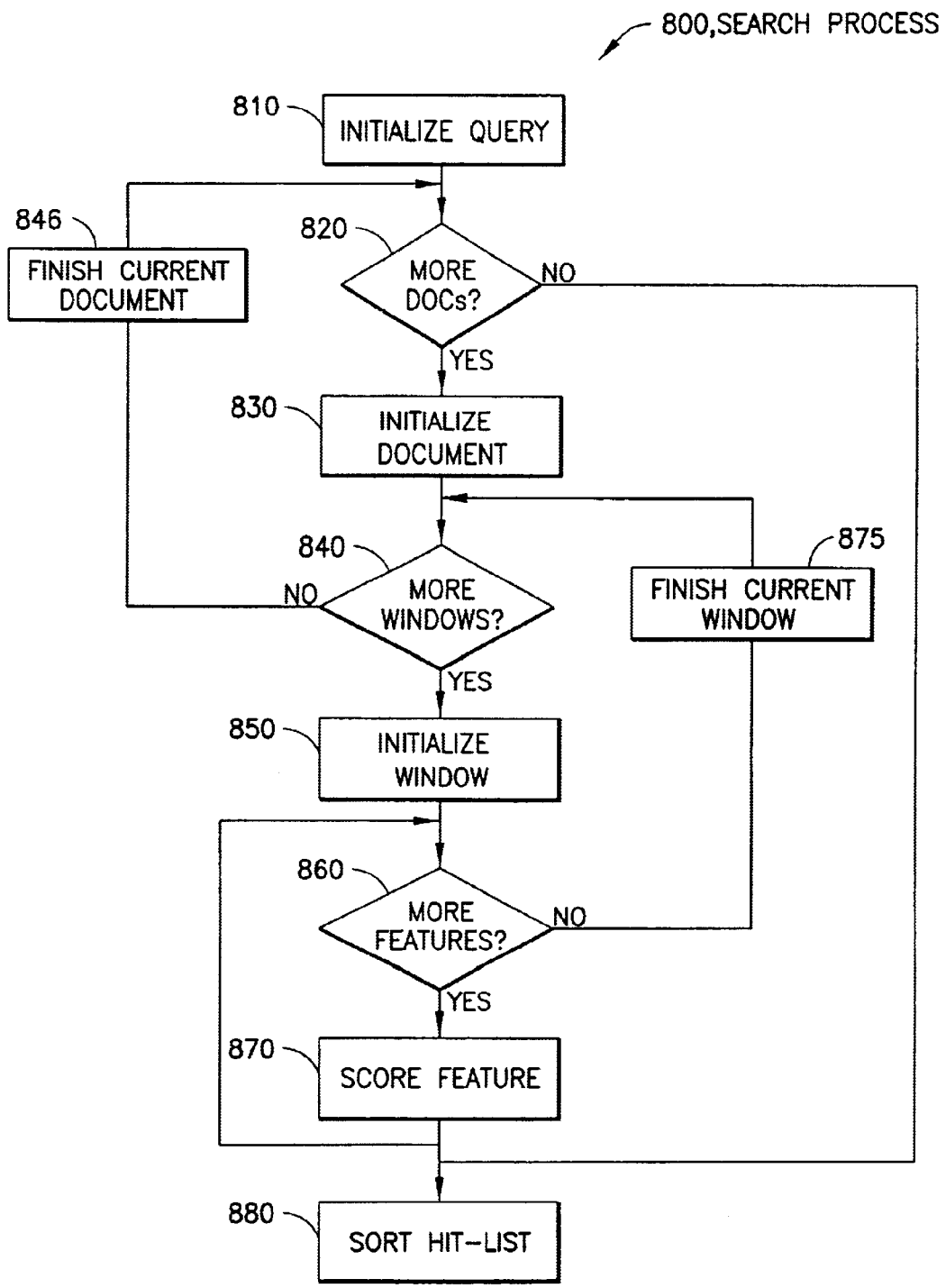
FIG. 8 is a flow chart of a search process.

FIG. 8 is a flowchart showing the method, steps for search in one preferred embodiment of the present invention. The search process 800 starts with initialization step 810. During initialization, the search query 250 is parsed, the indexed features identified in the query are located in the index 600, the corresponding inverted lists 610 are retrieved from the index, and any synonym operators in the query are evaluated by combining the inverted lists for features in the synonym.

After initialization, a loop to score all of the documents is entered in 820. If there are more documents to score, scoring of the next document proceeds in step 830. Otherwise execution continues with step 880 (described below). In step 830, the current document to score is initialized, which includes identifying the possible sentence windows within the document to score. The number of sentences in the sentence window specified in the query 250.

The search process then enters a loop in 840 to score each window in the current document. If there are no more windows to score, the document is added to the hit-list (an array of scored documents) in step 845, and execution continues at 820. If there are more windows to score, the current window is initialized in step 850. During step 850, any occurrences of the features from the query 250 are located in the current window, the current window's score is initialized to 0, and a loop to score each feature is entered in 860.

If there are more features to score in the current window, execution continues in step 870. In step 870, if the current feature occurs in the current window, the window's score is incremented by the weight of the feature. The weight may be binary or a more complex tf*idf weight, and it may be modified by a weighting factor specified in the query 250. The preferred embodiment uses modified binary weights. The features may also be found in the window in an exclusive fashion, meaning that the word positions of the features found in the current window may not overlap. (Recall from FIG. 7 that the features indexed for a document may have overlapping word positions if multiple features are found for the same word during document analysis). Whether or not the features are found in an exclusive fashion and the order in which they are found is specified in the query 250.

When there are no more features to score in the current window, execution continues in step 875. In step 875, the window score may be modified by a density factor, where the distance between the first query feature to appear in the window and the last query feature to appear in the window is measured and factored into the window score. In the preferred embodiment, the density factor is computed as the inverse of the measured distance and is added to the window score. Thus, the smaller the distance (i.e., the more dense the query features are in the window), the larger the window score. The current window score is then compared with the best window score so far for the current document. If the current window score exceeds the document's best window score, the document's best window score is updated with the current window score. Execution then continues with the next window for the current document in step 840.

When all documents have been score, the hit-list of documents is sorted by document score and the top n hits are returned as Result List 270. The number of hits n to return is specified with the query 250. Each hit identifies the document, the document score, and the window in the document that produced that score.

We claim:

1. A system for searching free form text comprising:
a computer with one or more memories and one or more central processing units (CPUs), one or more of the memories having one or more documents, the documents containing a plurality of words in free form text, the free form text having a natural language structure;

a pattern data structure having a plurality of pattern records, each pattern record containing a question template, an associated question word pattern, and an associated set of QA-Tokens;

a query process that receives one or more queries as input and matches one or more of the queries to one or more of the question templates to determine one or more template matches, the query process further replacing the associated question word pattern in the matching query with the associated set of QA-Tokens, being processed query QA-Tokens, the query process creating a processed query having the QA-Tokens and one or more processed query words being the words of the queries that were not replaced;

a text index data structure having a plurality of index records, each index record having one or more index words with one or more index word location in one or more of the documents and further having one or more index records with one or more index QA-Tokens with one or more index QA-Token locations in one or more of the documents, the index QA-Tokens being an abstraction of one or more of the words; and a searching process that matches one or more of the process query words with one or more of the index words and one or more of the processed query QA-Tokens with one or more of the index QA-Tokens, the index words and QA-Tokens being features, the searching process further scoring one or more windows by sliding the window over one or more sentences of one or more of the documents, the score of the window being dependent on the number of matching locations in the window.

2. A system, as in claim 1, where the matching between patterns and queries contains a Priority Algorithm to determine the best match.

3. A system, as in claim 1, where the query process further omits one or more of the processed query words as useless words.

4. A system, as in claim 1, where the query process further weights one or more of the processed query words.

5. A system, as in claim 1, where one or more of the processed query words are substituted with one or more of their canonical forms.

6. A system, as in claim 1, where one or more of the processed query words are substituted with one or more of their lemma forms.

7. A system, as in claim 1, where one or more of the processed query words are substituted with one or more of their equivalent forms.

8. A system, as in claim 1, where one or more of the question templates has one or more template variables.

9. A system, as in claim 8, where one or more of the pattern records has a question template with one or more template variables that defines a substitute template for another question template.

10. A system, as in claim 8, where one or more of the template variables changes to create one or more substitute templates for another question templates.

11. A computer executed method for searching a plurality of words in one or more documents in free form text, the free form text having a natural language structure, the method comprising the steps of:

receiving one or more queries as input;

matching one or more of the queries to one or more question templates of a pattern record, the pattern record further containing an associated question word pattern and an associated set of QA-Tokens, the matching determining one or more template matches, the query process further replacing the associated question word pattern in the matching query with the associated set of QA-Tokens, being processed query QA-Tokens, the query process creating a processed query having the QA-Tokens and one or more processed query words being the words of the queries that were not replaced; and a searching process that matches one or more of the process query words with one or more index words in an index record and one or more of the processed query QA-Tokens with one or more of the index QA-Tokens, in the index record, the index words and QA-Tokens being features, the searching process further scoring one or more windows by a sliding the window over the one or more sentences of one or more of the documents, the score of the window being dependent on the number of matching locations in the window.

12. A computer system for searching a plurality of words in one or more documents in free form text, the free form text having a natural language structure, the system comprising:

means for receiving one or more queries as input;

means for matching one or more of the queries to one or more question templates of a pattern record, the pattern record further containing an associated question word pattern and an associated set of QA-Tokens, the matching determining one or more template matches, the query process further replacing the associated question word pattern in the matching query with the associated set of QA-Tokens, being processed query QA-Tokens, the query process creating a processed query having the QA-Tokens and one or more processed query words being the words of the queries that were not replaced; and means for matching one or more of the process query words with one or more index words in an index record and one or more of the processed query QA-Tokens with one or more of the index QA-Tokens, in the index record, the index words and QA-Tokens being features, the searching process further scoring one or more windows by a sliding the window over the one or more sentences of one or more of the documents, the score of the window being dependent on the number of matching locations in the window.

13. A computer program product that performs the steps of:

matching one or more queries to one or more question templates of a pattern record, the pattern record further containing an associated question word pattern and an associated set of QA-Tokens, the matching determining one or more template matches, the query process further replacing the associated question word pattern in the matching query with the associated set of QA-Tokens, being processed query QA-Tokens, the query process creating a processed query having the QA-Tokens and one or more processed query words being the words of the queries that were not replaced; and a searching process that matches one or more of the process query words with one or more index words in an index record and one or more of the processed query QA-Tokens with one or more of the index QA-Tokens, in the index record, the index words and QA-Tokens being features, the searching process further scoring one or more windows by a sliding the window over the one or more sentences of one or more of the documents, the score of the window being dependent on the number of matching locations in the window.

* * * * *